Figure 3:
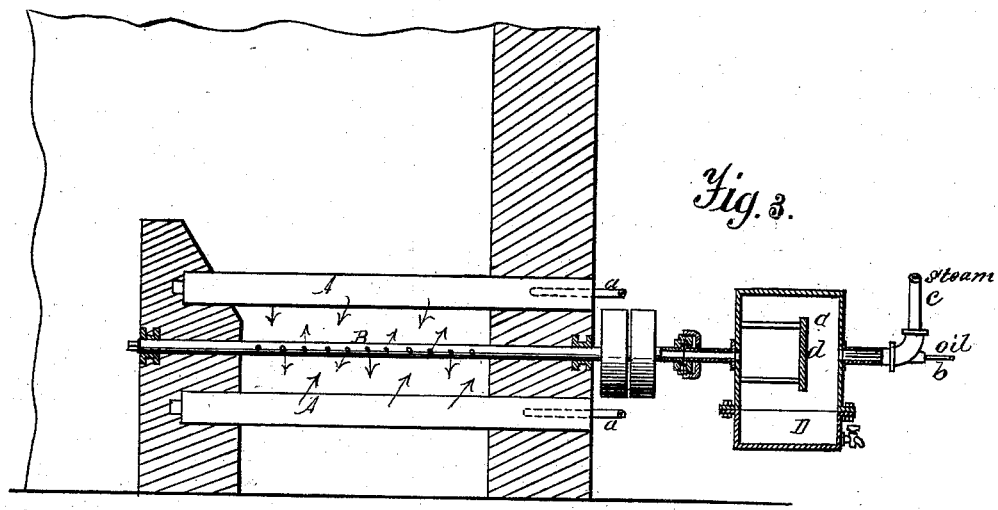

(No Model.)  H. T. LITCHFIELD & D. RENSHAW.  2 Sheets—Sheet 1.
HYDROCARBON FURNACE.
No. 262,960. Patented Aug. 22, 1882.
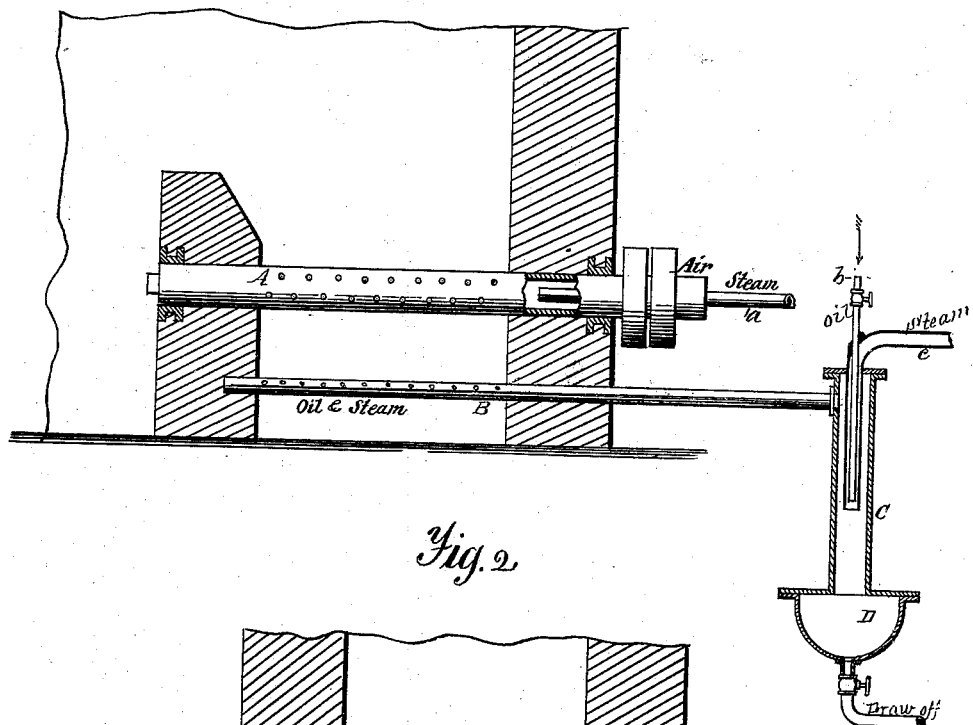
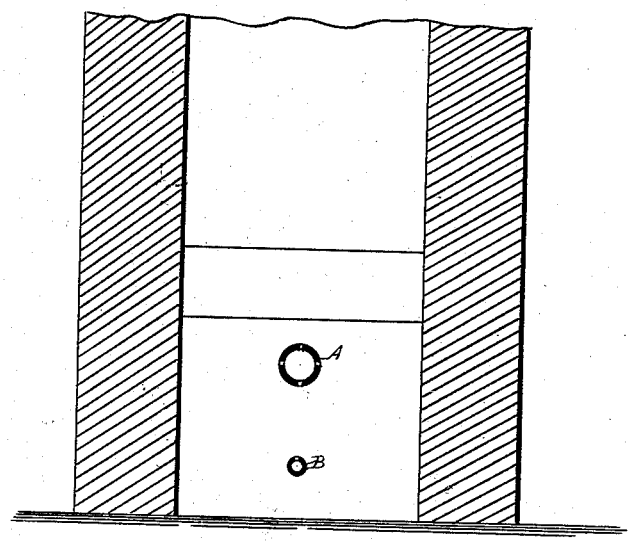
Witnesses.
A. Ruppert.
William Beck.
Inventor.
Harvey Litchfield
David Renshaw (No Model.) 2 Sheets—Sheet 2.

H. T. LITCHFIELD & D. RENSHAW.
HYDROCARBON FURNACE.

No. 262,960. Patented Aug. 22, 1882.

Witnesses.
A. Ruppert.
William Beck.

Inventor.
Harvey Litchfield
David Renshaw.

UNITED STATES PATENT OFFICE.

HARVEY T. LITCHFIELD, OF HULL, AND DAVID RENSHAW, OF COHASSET, MASSACHUSETTS.

HYDROCARBON-FURNACE.

SPECIFICATION forming part of Letters Patent No. 262,960, dated August 22, 1882.

Application filed December 23, 1881. (No model.)

*To all whom it may concern:*

Be it known that we, HARVEY T. LITCHFIELD, of Hull, in the county of Plymouth, and DAVID RENSHAW, of Cohasset, in the county of Norfolk and State of Massachusetts, have invented certain new and useful Improvements in Hydrocarbon-Furnaces; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

Our invention relates to improvements in generating and communicating heat, and to certain apparatus and means by which our said improvements in generating and communicating heat are employed. The heat is produced by the ignition or burning of a jet or jets of mixed air, gas, and steam. The gases employed are common gas, coal-gas, carbureted hydrogen, the vapor of hydrocarbons, hydrogen gas, carbonic-oxide gas, or the mixture of hydrogen and carbonic oxide obtained by passing steam or steam and air over carbonaceous materials or other inflammable or mineral substances.

It is well known that nearly all mineral oils are, comparatively speaking, pure hydrocarbons, free from sulphur, and also from the ordinary impurities which occasion ash when coal is burned, and generally devoid also of the oxygen which forms a part of the solid fuel, and therefore diminishes its calorific power.

With our invention we supply the necessary ingredients to the hydrocarbon oils; and to this end it consists in gradually converting the oil into a thin vapor of mixed carbon and hydrogen, therewith impregnating atmospheric air, so that it shall enter the furnace already sufficiently combined with gaseous carbon and hydrogen to be immediately and by itself inflammable.

In carrying our said invention into effect the atmospheric air used is mixed with any one of the gases or vapors, preferably steam and in retort, in this case a rotating one. The oil is mixed with steam in any suitable vessel, or in pipes previous to issuing into the furnace. Atmospheric air and steam and the oil and steam respectively are independently mixed, and are kept under a sufficient pressure to cause the mixed air and gas to issue at any required force and velocity through the supply-pipe conduits, issuing out of which the mixed air and gas are burned, as will hereinafter more fully appear.

Heretofore oil has been vaporized in various ways and by many devices introduced into furnaces with more or less success, but none of which afforded perfect combustion, for the reason that some one or more of the essential elements were wanting, and we therefore lay no claim to any such, for their principle of admixture, mode of burning, and supply are all entirely different. It will be understood, however, that we do not limit ourselves to specific proportions, as any proportions of air and gas and steam, or either of them, which constitute an inflammable mixture may be employed; and, further, instead of mixing one only of the before-mentioned gases with atmospheric air, any two or more of the gases may be mixed with air.

Figure 4:
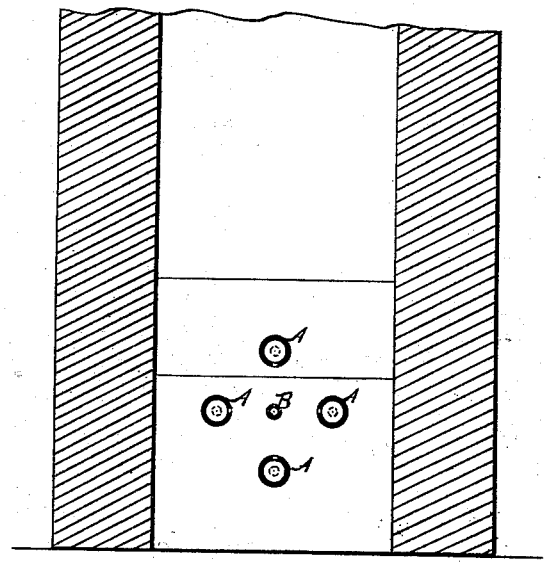

Referring to the two sheets of drawings hereto appended, Figure 1 illustrates our invention, it being in elevation, arranged lengthwise of a furnace, the side of the furnace being removed and a portion of the perforated pipe being broken away to show the steam-injector nozzle. Fig. 2 shows an end view of the same in transverse section; Fig. 3, a modification showing a series of two air and steam pipes arranged one above the other, and the steam and oil vapor rotating pipe arranged centrally between them. Fig. 4 is an end view of four pipes in transverse section, arranged at nearly right angles to each other, the gas-pipe centrally between them.

In Fig. 1, A is a rotating perforated pipe. The perforations or apertures (as they may be elongated) may be graduated as occasion and demand may require. This pipe A is journaled in trunnions, which may be of any approved pattern. Within the said pipe A is a smaller one, *a*, which supplies steam. The end of the large pipe being open for the air-supply, which is drawn in by the steam-jet, both the air and steam pipes may be controlled by valves. On the open or steam-nozzle end of the large pipe we locate two pulleys, one loose and one tight, by means of which the pipe may be rotated at will. So far as we have described this Fig. 1 it is the same as that granted David Renshaw in a former patent, January 3, 1882, No. 251,797. Our special improvements, therefore, are in connection with the said rotating pipe.

B is the smaller oil and steam supply pipe, located immediately below the pipe A, or, in other words, occupies the position ordinarily of the grate-bars, and supplies the fuel. Connected to the end of the pipe B is located a mixing and vaporizing chamber, C, and at its bottom, and forming part thereof, is an oil-trap, D. The function of this combined chamber and trap is a very important element in the working of our apparatus, although where gas is already made the apparatus would work without it; but for using the heavier petroleum oils this mixing-chamber or trap, or its equivalent, is essential.

The apparatus is operated as follows: We turn on steam from the pipe $c$, and, opening valve on pipe $b$, allow oil to be delivered with the steam in comparatively very small quantities. The oil is sprayed and thrown down toward and into the trap, while its lighter gases are caught by the steam, and the two are thoroughly mixed within the chamber, and are forced by the same steam-pressure into the perforated pipe B and through said perforations and ignited. It will be observed that the perforations face upward, so that the jets will be thrown in an upward direction. The pipe A is now revolving at the necessary speed, and in so doing throws from its apertures or perforations combined steam and air jets, the steam and air being raised to a high temperature. Now, the upper and lower pipes respectively being in full operation, the oil vapor jets issuing from the small pipe and the highly-heated steam and air jets issuing from the larger revolving pipe, it will be seen that a thorough mixture of all the elements takes place, and consequently thorough combustion ensues. It will be observed that the action of the steam in this trap is to drive the oil to the bottom, that by the depth of said trap and the action of the steam combined the oil cannot rise again, except as a vapor, thus preventing the delivery of heavy and tarry substances in the furnace, as well as causing a more complete union of steam and oil-gas.

Referring to Figs. 3 and 4, Sheet 2, the same principle is involved; but instead of rotating the air and steam pipes, we rotate the vapor-pipe, and the air and steam pipes are stationary. Instead of one air and steam pipe, we show four. This furnace, for large work, we consider the best, the agitation and mixture and consequent chemical union of the gases being, we believe, the most thorough ever shown. It will be seen we provide this furnace also with a trap, but of slightly-different construction. Instead of making it as deep as that shown in Fig. 1, for the purpose of mixing the steam and oil and separating the heavy oils, we use deflecting-plate $d$, so that the steam and oil are thrown together against said plate, and are to a great extent vaporized, the heat of the steam being sufficient for that purpose. The heavy or tarry portion of the oil is deposited in the trap. Should the traps become filled with residuum of the oil, the bottoms may be detached and cleaned out. It will be further seen—and this, too, is important—that the apertures in the air and steam pipes face each other and also face the oil-vapor pipe, so that there can be no failure of a thorough mixture of all the gases, which is so essential to thorough combustion. The volume of the several gases is controlled by the action of the steam jets and valves. By running the pipes lengthwise across furnaces the heat is evenly distributed to all parts. Should the perforations in the pipes become clogged or stopped up, they may be blown out with the force of steam alone.

We withdraw, but do not abandon, original claim three, (3,) as we desire to make it the subject-matter of another application.

Having now described our invention, what we claim as new, and desire to secure by Letters Patent, is—

1. The method herein described, consisting of first vaporizing oil in a suitable vessel by means of steam, separating the heavier oils from the volatile oils, then feeding the vapor thereof through perforated pipes, then mixing air and steam in a rotating perforated retort and injecting it into the furnace, causing the said vapor to thoroughly mix with the highly-heated steam and air for their more complete combustion, in the manner set forth and described.

2. The combination, in a hydrocarbon-furnace, of the vaporizing-chamber, the perforated pipe connected therewith, and the rotating air and steam pipes and their connections, operating together in the manner set forth and described.

3. The combination, in a furnace for burning gas or carbureted air, of the rotating pipes and the stationary pipes, said pipes being perforated and adapted for connection with supply-conduits, as shown and described.

In testimony that we claim the foregoing as our own act we affix our signatures in presence of two witnesses.

HARVEY T. LITCHFIELD.
DAVID RENSHAW.

Witnesses:
WILLIAM BRECK,
CHAS. F. BOYNTON.